United States Patent
Yang

(10) Patent No.: US 11,990,658 B2
(45) Date of Patent: May 21, 2024

(54) CARBON DIOXIDE-FORMATE REDOX FLOW BATTERY SYSTEM

(71) Applicant: THE REGENTS OF THE UNIVERSITY OF CALIFORNIA, Oakland, CA (US)

(72) Inventor: Jenny Y. Yang, Irvine, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 354 days.

(21) Appl. No.: 17/125,506

(22) Filed: Dec. 17, 2020

(65) Prior Publication Data

US 2021/0194031 A1 Jun. 24, 2021

Related U.S. Application Data

(60) Provisional application No. 62/951,911, filed on Dec. 20, 2019.

(51) Int. Cl.
*H01M 8/18* (2006.01)
*H01M 4/92* (2006.01)

(52) U.S. Cl.
CPC .......... *H01M 8/188* (2013.01); *H01M 4/921* (2013.01); *H01M 4/925* (2013.01)

(58) Field of Classification Search
CPC ....... H01M 8/188; H01M 4/921; H01M 4/925
See application file for complete search history.

(56) References Cited

U.S. PATENT DOCUMENTS

| | | | | |
|---|---|---|---|---|
| 2006/0099482 | A1* | 5/2006 | Scott | H01M 8/0232 429/485 |
| 2018/0219240 | A1* | 8/2018 | Gyenge | H01M 8/20 |

OTHER PUBLICATIONS

Hwang et al., "Pd—Sn Alloy Electrocatalysts for Interconversion Between Carbon Dioxide and Formate/Formic Acid", 2017, American Scientific Publishers, vol. 17 No. 10 (Year: 2017).*
Wiedner et al., Thermodynamic Hydricity of Transition Metal Hydrides, 2016, Chemicals Reviews, 2016, 116, pp. 8655-8692 (Year: 2016).*
Kumar et al., On the Use of Aqueous Meta-Aqua PKa Values as a Descriptor of Lewis Acidity, 2021, Inorganic Chemistry, 2021, 60, pp. 1107-1115 (Year: 2021).*

* cited by examiner

*Primary Examiner* — Eugenia Wang
(74) *Attorney, Agent, or Firm* — NGUYEN TARBET LLC

(57) ABSTRACT

Redox flow battery systems utilizing the reversible interconversion between carbon dioxide, (or bicarbonate or carbonate) and formate/formic acid. The battery system comprises an electrocatalyst that converts carbon dioxide, bicarbonate, or carbonate into formate to store electron equivalents, and oxidizes formate to release stored electrons and discharge. A non-limiting example of an electrocatalyst that can be used for reversible interconversion of carbon dioxide and formate is Pt(depe)$_2$.

12 Claims, 3 Drawing Sheets
(3 of 3 Drawing Sheet(s) Filed in Color)

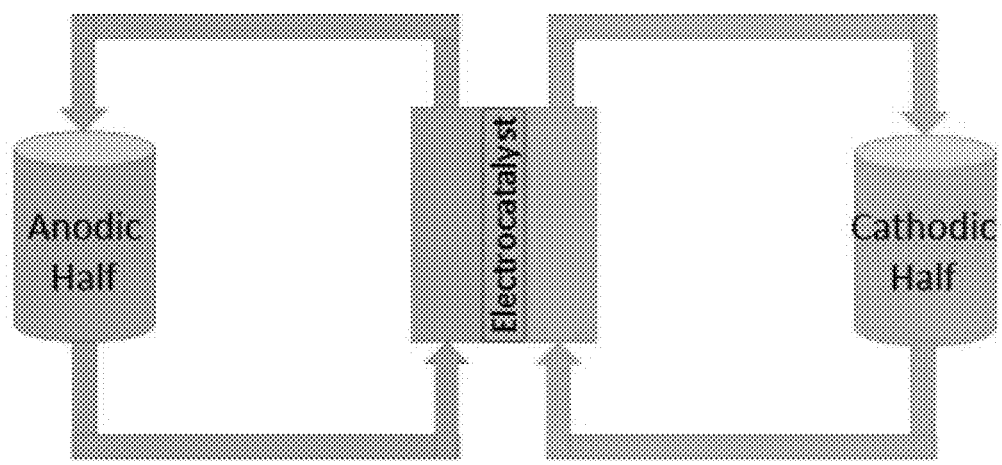
FIG. 1C
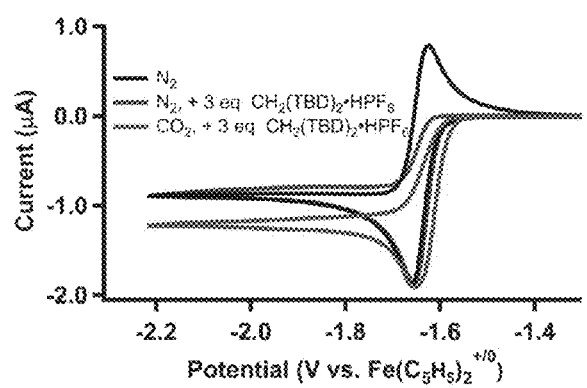
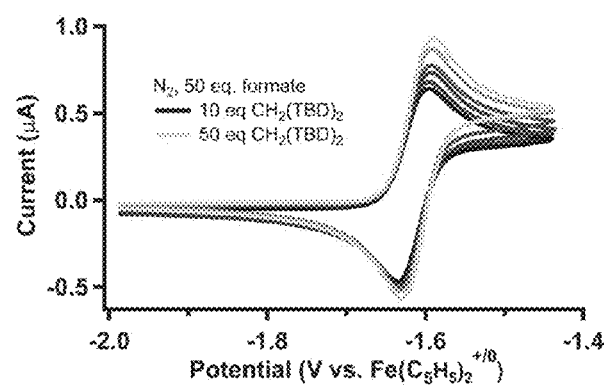
FIG. 2A  FIG. 2B

CARBON DIOXIDE-FORMATE REDOX FLOW BATTERY SYSTEM

CROSS-REFERENCES TO RELATED APPLICATIONS

This application is a non-provisional and claims benefit of U.S. Patent Application No. 62/951,911, filed Dec. 20, 2019, the specification(s) of which is/are incorporated herein in their entirety by reference.

STATEMENT REGARDING FEDERALLY SPONSORED RESEARCH OR DEVELOPMENT

This invention was made with government support under Grant No. DE-SC0012150 and DE-0000243266 awarded by the US Department of Energy. The government has certain rights in the invention.

BACKGROUND OF THE INVENTION

Field of the Invention

The present invention relates to redox flow batteries, more particularly to an electrochemical redox flow battery with a redox couple featuring carbon dioxide, bicarbonate, or carbonate with formate.

Background Art

Renewable energy sources suffer from temporal intermittency. Widespread use requires advanced methods of energy storage that are affordable, stable, cyclable, and reliable. Commercial, grid-scale energy storage systems are primarily Li-ion based and for short duration (e.g., minutes to a few hours), with the exception of pumped hydroelectric storage, which is highly effective, yet geographically restricted.

Redox flow batteries offer an opportunity for economical, long duration (e.g., greater than 4 hour discharge time) energy storage, as the engineering architecture allows for the separation of power and energy. However, wide-scale commercialization and deployment of redox flow batteries have been hampered by high cost, owing to the cost of the redox flow chemistry active materials and/or their corresponding system design.

Reversible catalysis between energy storage and utilization reactions has been called a 'holy grail' in catalysis, and can only be achieved by levelling the energy landscape of the catalytic cycle. Electrocatalysts that function for both reduction and oxidation reactions are considered bi-directional; however, they are only reversible if they operate at a minimal overpotential in both directions. True reversible reactivity indicates minimal changes in free energy between intermediates, coupled with low transition state barriers.

The prototypical example of a reversible electrocatalyst is platinum, which facilitates hydrogen production and oxidation (see Equation 1, FIG. 1A) at negligible overpotentials. In nature, hydrogenase enzymes also display reversible electrocatalytic activity and operate near the thermodynamic potential, although different variants display a bias towards either $H^+$ reduction or $H_2$ oxidation. More recently, a few synthetic catalysts have achieved reversible $2H^+/H_2$ electrocatalysis.

Research in $H_2$ electrocatalysis is motivated by the prospect of storing renewable electricity in a chemical bond. However, challenges associated with using a gaseous fuel has stimulated interest in applying renewable electricity to recycle $CO_2$ into liquid fuels. One solution is the reduction of $CO_2$ to $HCO_2^-$ (formate) (see Equation 2, FIG. 1A), a soluble fuel more convenient for storage and transportation. The reverse reaction, electrocatalytic oxidation of formate, is valuable in fuel cells.

Others have described the electrocatalytic activity of a bi-directional $CO_2$/formate electrocatalysis with an iridium pincer compound. Although the compound catalyzes both the reduction and oxidation reaction, the onset potentials are separated by ~1 V. The electrocatalytic activity of Pd—Pt nanoparticles towards $CO_2$ reduction to formic acid at low overpotentials with a maximum Faradaic efficiency of 88%, with the balance of electrons contributing to $H_2$ evolution, has also been observed, as well as electrocatalysis of the reverse reaction, formic acid oxidation. However, the Pd—Pt nanoparticle catalyst suffered from deactivation by CO intermediates in both directions. Prior to this work, stable, highly selective reversible catalysis at minimal overpotentials for $CO_2$ to $HCO_2^-$ interconversion had only ever been observed in two formate dehydrogenase (FDH) enzymes: Mo-dependent FDH from *Escherichia coli* (EcFDH-H) and W-dependent FDH from *Syntrophobacter fumaroxidans*.

BRIEF SUMMARY OF THE INVENTION

The present invention describes using the reversible interconversion between carbon dioxide and formate for a redox flow battery.

The present invention also features methods and systems for reversibly interconverting carbon dioxide (or bicarbonate or carbonate) and its reduced species (formate/formic acid) with low overpotential (e.g., <100 mV, <50 mV, <25 mV, <10 mV) at high current efficiency (e.g., >90%, >95%, >99%).

The present invention also features redox flow battery systems that utilize carbon dioxide, bicarbonate, or carbonate as the negative active material, wherein charge and discharge of the battery is affected by interconversion between carbon dioxide-bicarbonate-carbonate and formate-formic acid.

In certain embodiments, the electrocatalyst for $CO_2$/$HCO_2^-$ conversion comprises Pt(depe)$_2$ (e.g., [Pt(depe)$_2$][PF$_6$]$_2$, depe=1,2-bis(diethylphosphino)ethane).

The present invention also features redox flow battery systems comprising the aforementioned electrocatalysts, wherein the positive active material is ferrocyanide/ferricyanide, Prussian white/Prussian blue, bromide/bromine, and/or Prussian blue/berlin green.

Without wishing to limit the present invention to any theory or mechanism, it is believed that the methods and systems of the present invention are advantageous because the use of carbon dioxide, bicarbonate, or carbonate is significantly cheaper than current analytes in commercial systems. Further, the formate produced will have greater solubility, which could increase the energy density. If the catalyst can function with bicarbonate or carbonate, it may also have greater solubility. Additionally, the target reduced species represents multi-electron processes, which could improve energy density.

A reversible synthetic electrocatalyst (Pt(depe)$_2$) for $CO_2$/$HCO_2^-$ conversion was surprisingly found. The catalyst not only reduces $CO_2$ to $HCO_2^-$ near the thermodynamic potential, but does so with high selectivity (no direct proton reduction to $H_2$ is observed). It was found that under conditions optimized for reversible catalysis, $H_2$ evolution is endergonic, leading to high Faradaic efficiency for formate. An analysis of other known transition metal hydride complexes capable of $CO_2$ reduction to formate was also performed. It was found that when the acid source is selected to minimize the free energy of protonation (and thus operate at the lowest possible overpotential for the catalyst), $H_2$ evolution is nearly always endergonic, leading to high selectivity.

The present invention also features a redox flow battery system for reversibly interconverting carbon dioxide, bicarbonate, or carbonate and formate/formic acid. The battery system comprises an electrocatalyst which: (a) converts carbon dioxide, bicarbonate, or carbonate into formate to store electron equivalents, and (b) oxidizes formate to release stored electrons and discharge.

In some embodiments, the positive active material of the battery system is ferrocyanide/ferricyanide. In some embodiments, the positive active material of the battery system is Prussian white/Prussian blue. In some embodiments, the positive active material of the battery system is bromide/bromine. In some embodiments, the positive active material of the battery system is Prussian blue/berlin green.

In some embodiments, the battery system reversibly interconverts carbon dioxide, bicarbonate, or carbonate and formate/formic acid with an overpotential of <100 mV. In some embodiments, the battery system reversibly interconverts carbon dioxide, bicarbonate, or carbonate and formate/formic acid with an overpotential of <90 mV. In some embodiments, the battery system reversibly interconverts carbon dioxide, bicarbonate, or carbonate and formate/formic acid with an overpotential of <50 mV.

In some embodiments, the battery system reversibly interconverts carbon dioxide, bicarbonate, or carbonate and formate/formic acid with a current efficiency of >90%. In some embodiments, the battery system reversibly interconverts carbon dioxide, bicarbonate, or carbonate and formate/formic acid with a current efficiency of >95%. In certain embodiments, the battery system reversibly interconverts carbon dioxide, bicarbonate, or carbonate and formate/formic acid with a current efficiency of >99%.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE SEVERAL VIEWS OF THE DRAWING(S)

The patent application or application file contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which:

FIG. 1C shows a simplified embodiment of the redox flow battery system.

FIG. 2A shows cyclic voltammograms of $[Pt(depe)_2][PF_6]_2$ (1.0 mM) under a nitrogen atmosphere (black) and in the presence of 3 equivalents of $CH_2(TBD)_2 \cdot HPF_6$ under nitrogen (blue) and under a carbon dioxide atmosphere (red).

FIG. 2B show cyclic voltammograms of $[HPt(depe)_2][PF_6]$ (1.0 mM) under a nitrogen atmosphere in the presence of $[n\text{-}Bu_4N][HCO_2]$ (50 mM) with concentrations of $CH_2(TBD)_2$ ranging between 10 mM (black) and 50 mM (light blue). All scans were recorded in 0.2 M TBAPF in acetonitrile at a scan rate of 5 mV/s.

DETAILED DESCRIPTION OF THE INVENTION

Figure 1A:
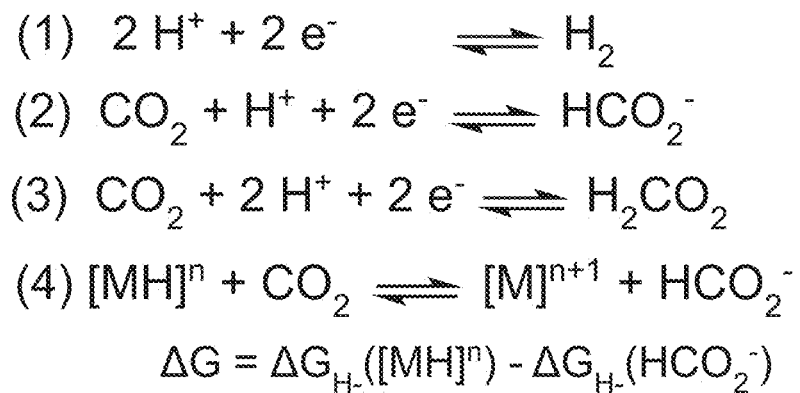
FIG. 1A shows redox reactions related to the present invention.

The present invention features redox flow battery systems for reversibly interconverting carbon dioxide (or bicarbonate or carbonate) and its reduced species (formate/formic acid) with low overpotential at high current efficiency.

In further embodiments, the present invention features an electrocatalyst for reversibly interconverting carbon dioxide-bicarbonate-carbonate and formate-formic acid.

In preferred embodiments, the electrocatalyst is selected from $Pt(depe)_2$ or $[Pt(depe)_2][PF_6]_2$.

In other embodiments, the present invention features a redox flow battery system comprising a positive active material, a negative active material, and an electrocatalyst. Examples of the positive active material include, but are not limited to, ferrocyanide, Prussian white, Prussian blue, or bromide. In further embodiments, the negative active material is selected from carbon dioxide, bicarbonate, or carbonate. In other embodiments, the electrocatalyst is selected from $Pt(depe)_2$ or $[Pt(depe)_2][PF_6]_2$.

The positive active material is the anodic half of the redox flow battery, and is where the material is oxidized. For example, the positive active material is oxidized from ferrocyanide to ferricyanide, Prussian white to Prussian blue, Prussian blue to berlin green, or bromide to bromine. The negative active material is the cathodic half of the redox flow battery and is where the material is reduced. For example, carbon dioxide, bicarbonate, or carbonate is reduced to formate.

The redox flow battery system of the present invention utilizes carbon dioxide, bicarbonate, or carbonate as the negative active material, wherein charge and discharge of the battery is affected by interconversion between carbon dioxide-bicarbonate-carbonate and formate-formic acid. The positive active material is oxidized to supply electrons to reduce the negative active material. The electrocatalyst of the redox flow battery reduces carbon dioxide, bicarbonate, or carbonate to formate to store electron equivalents to charge the battery. The formate is oxidized by the electrocatalyst to release the stored electrons and discharge the battery.

As a non-limiting example, the redox battery system of the present invention comprises a flow cell with a cathodic half and an anodic half. Instead of having redox active analytes on the cathodic and anodic halves of the flow cell as is found with traditional flow cell batteries, an electrocatalyst is used to convert carbon dioxide, bicarbonate, or carbonate into formate to store electron equivalents to charge the battery. The electrocatalyst is utilized to oxidize the formate to release the stored electrons and discharge the battery.

The electrocatalysts described herein function with minimal overpotential (high energetic efficiency) for the reversible conversion of carbon dioxide to formate that makes a redox flow battery of this type possible.

In preferred embodiments, the cathodic half of the flow cell comprises the negative active material. The negative active material is selected from carbon dioxide, bicarbonate, or carbonate. In further embodiments, the anodic half of the flow cell comprises the positive active material. Non-limiting examples of materials used for the positive active material include ferrocyanide, Prussian white, Prussian blue, or bromide. The positive active material is oxidized from ferrocyanide to ferricyanide, Prussian white to Prussian blue, Prussian blue to berlin green, or bromide to bromine.

The data shown in Example 1 below establish that $Pt(depe)_2$ (e.g., $[Pt(depe)_2][PF_6]_2$) is an example of a selective electrocatalyst for the reversible conversion between $CO_2$ to formate. The thermodynamic potential at a $pK_a$ of 29.0 is $-1.63$ V vs $Fe(C_5H_5)_2^{+/0}$. The overpotential calculated using the $E_{1/2}$ value for $[Pt(depe)_2][PF_6]_2$ is 10 mV. Non-limiting examples of alternative electrocatalysts include: $Fe_4[C(CO_{12})H]_2$, $Co(CpC_5F_4N)(P^{tBu}{}_2N^{Ph}{}_2)(CH_3CN)$, $Co(dmpe)_2$, $Ru(Tpy)(Bpy)(CH_3CN)$, $Ru(Tpy)(Bpy)$, $Rh(dppb)$, $Rh(P^{Ph}{}_2N^{Bz}{}_2)$, $Rh(P^{Cy}{}_2N^{Ph\text{-}OMe}{}_2)$, $Rh(P^{Ph}{}_2N^{Ph\text{-}OMe}{}_2)$, $Rh(P^{Cy}{}_2N^{Ph}{}_2)$, $Rh(dmpe)_2$, $Ir(Cp^*)(Bpy)$, $Pt(depe)_2$, and $Pt(dmpe)_2$. Without wishing to limit the present invention to any theory or mechanism, the use of external acids that match the $pK_a$ of the metal hydride to minimize the protonation energy results in endergonic $H_2$ evolution, consequently ensuring catalyst selectivity for $CO_2$ reduction.

The system of the present invention reversibly interconverts carbon dioxide (or bicarbonate or carbonate) and its reduced species (e.g., formate-formic acid) with low overpotential (e.g., overpotentials of about <100 mV, <90 mV, <80 mV, <70 mV, <60 mV, <50 mV, <40 mV, <30 mV, <25 mV, <20 mV, <10 mV) at high current efficiency (e.g., current efficiencies of about >90%, >91%, >92%, >93%, >94%, >95%, >96%, >97%, >98%, >99%).

In other embodiments, the present invention comprises a method for storing and releasing electrical energy using the redox flow battery system described herein. The method comprises providing the redox flow battery comprising a positive active material, a negative active material comprising carbon dioxide, bicarbonate, or carbonate, and an electrocatalyst. The electrocatalyst converts carbon dioxide, bicarbonate, or carbonate into formate to store electron equivalents. The electrocatalyst also oxidizes formate to release stored electrons and discharge. Non-limiting examples of materials used for the positive active material include ferrocyanide, Prussian white, Prussian blue, or bromide. The positive active material is oxidized from ferrocyanide to ferricyanide, Prussian white to Prussian blue, Prussian blue to berlin green, or bromide to bromine.

In some embodiments, the electrocatalyst is selected from $Pt(depe)_2$ or $[Pt(depe)_2][PF_6]_2$. Non-limiting examples of alternative electrocatalysts include: $Fe_4[C(CO_{12})H]_2$, $Co(CpC_5F_4N)(P^{tBu}{}_2N^{Ph}{}_2)(CH_3CN)$, $Co(dmpe)_2$, $Ru(Tpy)(Bpy)(CH_3CN)$, $Ru(Tpy)(Bpy)$, $Rh(dppb)$, $Rh(P^{Ph}{}_2N^{Bz}{}_2)$, $Rh(P^{Cy}{}_2N^{Ph\text{-}OMe}{}_2)$, $Rh(P^{Ph}{}_2N^{Ph\text{-}OMe}{}_2)$, $Rh(P^{Cy}{}_2N^{Ph}{}_2)$, $Rh(dmpe)_2$, $Ir(Cp^*)(Bpy)$, $Pt(depe)_2$, and $Pt(dmpe)_2$.

In other embodiments, the method reversibly interconverts carbon dioxide-bicarbonate-carbonate and formate-formic acid with an overpotential of about <100 mV, <90 mV, <80 mV, <70 mV, <60 mV, <50 mV, <40 mV, <30 mV, <25 mV, <20 mV, or <10 mV. In some embodiments, the method reversibly interconverts carbon dioxide, bicarbonate, or carbonate and formate-formic acid with a current efficiency of about >90%, >91%, >92%, >93%, >94%, >95%, >96%, >97%, >98%, or >99%.

EXAMPLE

The following is a non-limiting example of the present invention. It is to be understood that said example is not intended to limit the present invention in any way. Equivalents or substitutes are within the scope of the present invention.

The results described herein demonstrate how flattening the energy landscape leads to more efficient and selective catalysis.

Catalyst Selection: Reversible $CO_2/HCO_2^-$ Reactivity. The free energy of hydride transfer from a transition metal hydride to generate $HCO_2^-$ (from $CO_2$) is described by their hydricities ($\otimes G°_{H^-}$) according to Equation 4 (see FIG. 1A). Thus, in order to minimize the free energy for hydride transfer to $CO_2$, the hydricity of the transition metal hydride should closely match the hydricity of formate.

Others have measured the hydricity of $[HPt(depe)_2]^+$ to be 44.2 kcal/mol and noted that while $[HPt(depe)_2]^+$ reacts with $CO_2$ to form sub-stoichiometric amounts of $HCO_2^-$, $[HPt(depe)_2]^+$ could also be generated by addition of $HCO_2^-$ to $[Pt(depe)_2]^{2+}$. Based on these observations, it was evident the hydricity of $[HPt(depe)_2]^+$ is comparable to that of $HCO_2^-$, although its catalytic activity was not explored. The similar thermodynamic hydricities of $[HPt(depe)_2]^+$ and $HCO_2^-$ makes the former an ideal candidate for reversible reactivity. The electrocatalytic $CO_2$ reduction to formate with the related complex $[HPt(dmpe)_2]^{2+}$ (dmpe=1,2-bis(dimethylphosphino)ethane) has previously been reported. This variant, with methyl instead of ethyl groups on the phosphorous, has a hydricity of 41.4 kcal/mol. Hydride transfer to $CO_2$ for $[HPt(dmpe)_2]^{2+}$ is sufficiently favorable ($\Delta G°=-2.6$ kcal/mol) that catalysis is not reversible.

The equilibria between the hydride donor/acceptor pairs for the forward ($[HPt(depe)_2]^+/CO_2$) and reverse ($HCO_2^-/[Pt(depe)_2]^{2+}$) reactions provide good starting points to explore the chemical reversibility of the hydride transfer step. Utilizing previously described synthetic methods, both $[HPt(depe)_2]^+$ and $[Pt(depe)_2]^{2+}$ were isolated. Addition of $CO_2$ (1 atm) to an acetonitrile solution of $[HPt(depe)_2]^+$ resulted in formation of $[Pt(depe)_2]^{2+}$ in a ca. 16:1 ratio of $[Pt(depe)_2]^{2+}:[HPt(depe)_2]^+$ (quantified by $^{31}P\{^1H\}$ NMR spectroscopy). The high solubility of $CO_2$ at 1 atm in acetonitrile (280 mM $CO_2$ vs 20 mM $[HPt(depe)_2]^+$) and the ratio of products leads to an equilibrium constant ($K_{eq}$) of 1.05(7), which corresponds to a free energy of $\otimes G°=-0.03(4)$ kcal/mol.

To confirm that hydride transfer between $[HPt(depe)_2]^+$ and $CO_2$ is at thermodynamic equilibrium, the reverse reaction, hydride transfer from $HCO_2^-$ to $[Pt(depe)_2]^{2+}$, was also investigated. Equilibration of an acetonitrile solution of tetra-n-butylammonium formate with an equimolar amount of $[Pt(depe)_2]^{2+}$ under a $CO_2$ atmosphere yielded identical ratios for $[Pt(depe)_2]^{2+}/[HPt(depe)_2]^+$ of 16:1.

Figure 1B:
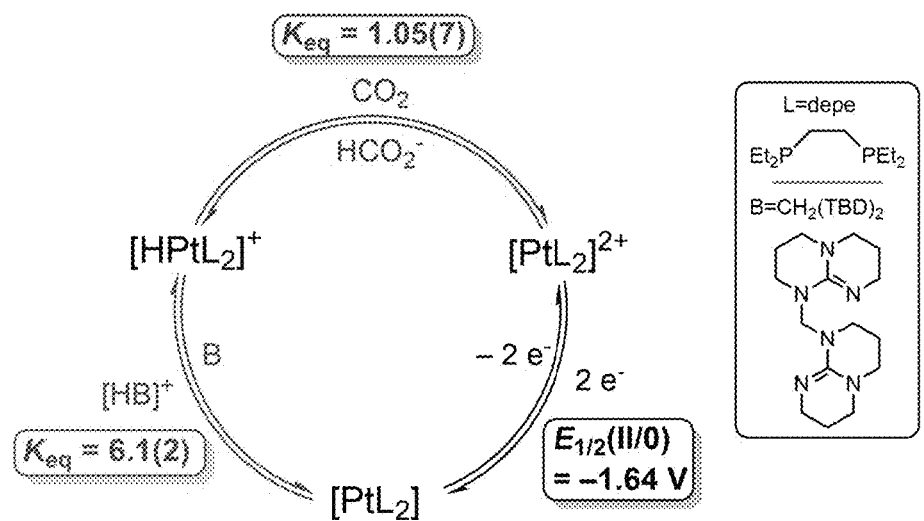
FIG. 1B shows a scheme with a proposed catalytic cycle for the reversible interconversion of carbon dioxide and its reduced species (formate/formic acid) using the electrocatalyst $Pt(depe)_2$.

Acid Selection: Protonation/deprotonation of the metal hydride. In order to generate $[HPt(depe)_2]^+$ for $CO_2$ reduction, an exogenous acid is required (see FIG. 1B). Likewise, the microscopic reverse reaction, $HCO_2$ oxidation, requires a base to deprotonate $[HPt(depe)_2]^+$. To remain ergoneutral, an acid/base pair with a $pK_a$ value comparable to that of $[HPt(depe)_2]^+$ is required. The $pK_a$ of $[HPt(depe)_2]^+$ was previously reported to be 29.7; thus, the acid/base pair selected was $CH_2(TBD)_2 \cdot HPF_6$ ($pK_a$ of 29.0 in acetonitrile)

and its conjugate base CH$_2$(TBD)$_2$ (TBD=triazabicyclodecene; structure shown in FIG. 1B). The stoichiometric deprotonation step between CH$_2$(TBD)$_2$ with [HPt(depe)$_2$]$^+$ was quantified by NMR spectroscopy. A J. Young tube containing varying amounts of [HPt(depe)$_2$]$^+$ and CH$_2$(TBD)$_2$ was monitored by $^{31}$P{$^1$H} NMR spectroscopy to determine the equilibrium constant (K$_{eq}$) of 6.1(2) (⊗G°=−1.07(2) kcal/mol).

Electron transfer. Completion of the catalytic cycle requires 2 e$^-$ transfer to [Pt(depe)$_2$]$^{2+}$ (CO$_2$ reduction) or from [Pt(depe)$_2$] (HCO$_2^-$ oxidation). The two oxidation states are separated by a reversible two-electron couple at −1.64 V vs Fe(C$_5$H$_5$)$_2$$^{+/0}$, shown as the black trace in FIG. 2A.

CO$_2$ Reduction. Reduction of [Pt(depe)$_2$][PF$_6$]$_2$ by cyclic voltammetry leads to the two-electron reduced product, [Pt(depe)$_2$] (see FIG. 2A, black trace). Addition of the acid, CH$_2$(TBD)$_2$☐HPF$_6$, under 1 atm of N$_2$ results in protonation after reduction to generate the hydride, [HPt(depe)$_2$]$^+$ (FIG. 2A, blue trace). The extent of protonation depends on the concentration of acid. When 1-2 equivalents of acid are added, some anodic return current is observed, consistent with incomplete protonation, and expected given the ~1 unit difference in pK$_a$ between the acid and hydride. When 3 or more equivalents are added (FIG. 2A, blue trace), protonation to generate the hydride proceeds to completion, no oxidation event associated with unreacted Pt(0) complex is observed.

The cyclic voltammetry under 1 atm of CO$_2$ with 3 equivalents of CH$_2$(TBD)$_2$☐HPF$_6$ is shown as the red trace in FIG. 2A. An increase in current is observed, along with the expected loss of reversibility. The increase in current suggests electrocatalytic CO$_2$ reduction by [Pt(depe)$_2$][PF$_6$]$_2$, which was confirmed by controlled potential electrolysis (CPE). A CO$_2$-saturated solution of [Pt(depe)$_2$][PF$_6$]$_2$ (0.0101 mmol) and CH$_2$(TBD)$_2$·HPF$_6$ (0.100 mmol) was electrolyzed at −2.0 V vs Fe(C$_5$H$_5$)$_2$$^{+/0}$ for 5 h. The total amount of charge passed was 11.25 C for a theoretical maximum amount of formate of 0.058 mmol. $^1$H NMR spectroscopy was used to quantify the amount of formate as 0.056 mmol. An internal standard was used in the $^{31}$P{$^1$H} NMR spectra before and after CPE to verify the platinum catalyst is completely retained. Additionally, the electrolysis was performed over a pool of mercury, indicating catalysis is not proceeding from the formation of nanoparticles. An equivalent CPE in the absence of catalyst resulted in negligible charge being passed. These results demonstrate [Pt(depe)$_2$][PF$_6$]$_2$ is a stable, homogeneous electrocatalyst for the reduction of CO$_2$ to formate with a minimum TON of 5.5 and Faradaic efficiency of 97%.

Formate oxidation. The reverse reaction of CO$_2$ reduction, electrocatalytic formate oxidation, was investigated by cyclic voltammetry (see FIG. 2B). Titration of 10 to 50 equivalents of base to a solution of [HPt(depe)$_2$][PF$_6$] with 50 equivalents of tetra-n-butylammonium formate led to an increase in peak current, consistent with electrocatalytic activity. Since catalysis is reversible, an increase in current is observed for both the anodic and cathodic scans.

Controlled potential electrolysis at −1.4 V vs Fe(C$_5$H$_5$)$_2$$^{+/0}$ of [Pt(depe)$_2$][PF$_6$]$_2$ (0.0113 mmol), tetra-n-butylammonium formate (0.1 mmol), and CH$_2$(TBD)$_2$ (0.1 mmol) in acetonitrile resulted in consumption of 0.027 mmol of formate after 4 hours.

A total charge of 5.71 C was transferred throughout the electrolysis period, which corresponds to a theoretical maximum formate consumption of 0.030 mmol. Throughout the electrolysis period the total amount of platinum species is conserved, as indicated by the $^{31}$P{$^1$H} NMR spectra taken before and after electrolysis. In addition, the CPE was also performed over a pool of mercury. An electrolysis experiment performed without catalyst under identical conditions resulted in negligible charge passed. Thus, [Pt(depe)$_2$][PF$_6$]$_2$ is a stable, homogeneous electrocatalyst for the oxidation of formate with a minimum TON of 2.4 and a Faradaic efficiency of 90% under these conditions.

Determination of Overpotential from Energy Landscape. The electrocatalytic data establish [Pt(depe)$_2$][PF$_6$]$_2$ is a selective electrocatalyst for the reversible conversion between CO$_2$ to formate. According to the most recent estimate of the standard potential for CO$_2$/HCO$_2^-$ in acetonitrile, the thermodynamic potential at a pK$_a$ of 29.0 is −1.63 V vs Fe(C$_5$H$_5$)$_2$$^{+/0}$. The overpotential calculated using the E$_{1/2}$ value for [Pt(depe)$_2$][PF$_6$]$_2$, as described by Appel et. al, is 10 mV. Note that the controlled potential electrolysis experiments are performed at the potential of maximum current, or 'peak current', to generate sufficient product for accurate quantification.

Figure 3:
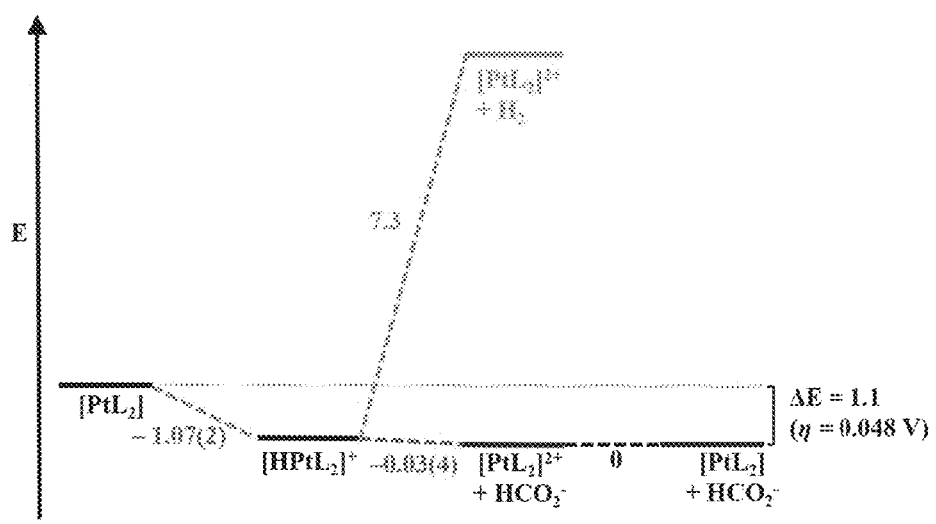
FIG. 3 shows the energy landscape under catalytic conditions ($pK_a$ of 29.0, 1 atm $CO_2$) at $-1.64$ V vs $Fe(C_5H_5)_2^{+/0}$ in $CH_3CN$. Energetic values are given in kcal/mol unless otherwise indicated.

The experimentally measured equilibrium constants of each intermediate step in the proposed catalytic cycle is represented in the energy landscape shown in FIG. 3. The energy of protonation of [Pt(depe)$_2$] to generate [HPt(depe) $_2$]*, followed by CO$_2$ addition to form HCO$_2^-$ and [Pt(depe) $_2$]$^{2+}$ is shown in kcal/mol. The free energy diagram is drawn at −1.64 V vs Fe(C$_5$H$_5$)$_2$$^{+/0}$, or the reversible two electron couple for [Pt(depe)$_2$]$^{2+}$/[Pt(depe)$_2$]. At this potential, the two species are equal in energy. By the measured equilibrium constants, the difference between the initial species and final species varies by −1.1 kcal/mol, which is equivalent to an overpotential of 0.048 V (1.0 kcal/mol is equivalent to 0.043 V), slightly higher than expected from the calculation above. A few sources of error are possible with the previously estimated thermodynamic potential. The latter relies on an estimate of the pK$_a$ of formic acid in acetonitrile, which has not been experimentally measured. The calculation also relies on the accuracy of the pK$_a$ of the CH$_2$(TBD) $_2$H$^+$ in acetonitrile and the absence of any effects (such as homoconjugation), in which the pK$_a$ would not precisely represent the proton activity of the solution. It was noted that the overpotential for CO$_2$ reduction of 0.048 V derived from the energy landscape is from internally consistent equilibrium values and is therefore a more accurate representation of the overpotential. By both calculations, the overpotential is small, as would be expected for a reversible electrocatalyst.

The derivation of the overpotential from the energy landscape depicts an essential tenant of efficient (and reversible) electrocatalysts—intermediate free energies must be minimized. Using a stronger acid than necessary for the protonation step would increase the overpotential by 59 mV, or 1.37 kcal/mol per excess pK$_a$ unit (consistent with the change in thermodynamic potential for a single proton reaction by the Nernst equation). To illustrate this point, the stronger acid TBD·HPFs (pK$_a$=26.0) was also used with this catalyst. Addition of TBD·HPFs to [Pt(depe)$_2$]$^{2+}$ results in protonation of [Pt(depe)$_2$] upon reduction of [Pt(depe)$_2$]$^{2+}$. After addition of CO$_2$, no current increase is observed even up to 100 equiv of TBD·HPFs, although the overpotential is now 177 mV larger.

Less intuitively, using a stronger hydride donor than necessary for CO$_2$ reduction would also increase the overpotential by 0.043 V per kcal/mol in excess free energy. Accordingly, it is important in catalyst design to quantify the free energies of bond-making and -breaking steps to make sure they are well matched to achieve a low overpotential.

Product Selectivity and General Applicability. Another noteworthy consequence of minimizing the free energies of intermediate steps is high selectivity for $CO_2$ reduction in the presence of protons. The free energy of $H_2$ evolution through protonation of the intermediate metal hydride can be quantified using the hydricity of the metal hydride, $pK_a$ of the proton source, and the heterolytic bond formation of $H_2$ (a solvent-dependent constant). Although the acid/base pair in the system was selected to match that of the metal hydride to enable reversible catalysis, the free energy of $H_2$ evolution with this acid and the intermediate hydride was found to be endergonic by 7.3 kcal/mol (FIG. 3, orange). To determine whether this is generally true, a compilation of all metal hydrides with reported hydricity values sufficiently hydridic to reduce $CO_2$ to formate with measured $pK_a$ values, a total of 17 complexes, was made. With only two exceptions, use of external acids that match the $pK_a$ of the metal hydride to minimize the protonation energy results in endergonic $H_2$ evolution, consequently ensuring catalyst selectivity for $CO_2$ reduction.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures. In some embodiments, descriptions of the inventions described herein using the phrase "comprising" includes embodiments that could be described as "consisting essentially of" or "consisting of", and as such the written description requirement for claiming one or more embodiments of the present invention using the phrase "consisting essentially of" or "consisting of" is met.

What is claimed is:

1. A redox flow battery, the system comprising:
    a. a positive active material;
    b. a negative active material comprising carbon dioxide, bicarbonate, or carbonate;
    c. an electrocatalyst that converts the carbon dioxide, bicarbonate, or carbonate into formate to store electron equivalents to charge the battery, and oxidizes the formate to release the stored electrons and discharge the battery; and
    d. an external acid in which the electrocatalyst performs the conversion, selected such that the electrocatalyst has a pKa equal to a pKa of the external acid, and wherein the electrocatalyst has a hydricity equal to a hydricity of formate under identical solvent conditions.

2. The redox flow battery system of claim 1, wherein the positive active material is ferrocyanide, Prussian white, Prussian blue, or bromide.

3. The redox flow battery system of claim 2, wherein the positive active material is oxidized from ferrocyanide to ferricyanide, Prussian white to Prussian blue, Prussian blue to berlin green, or bromide to bromine.

4. The redox flow battery system of claim 1, wherein the electrocatalyst is $Pt(1,2\text{-bis(diethylphosphino)ethane})_2$ or $[Pt(1,2\text{-bis(diethylphosphino)ethane})_2][PF_6]_2$.

5. A method for storing and releasing electrical energy using a redox flow battery, the method comprising:
    a. providing the redox flow battery comprising a positive active material, a negative active material comprising carbon dioxide, bicarbonate, or carbonate, and an electrocatalyst;
    b. conversion, by the electrocatalyst, of carbon dioxide, bicarbonate, or carbonate into formate to store electron equivalents; and
    c. oxidizing, by the electrocatalyst, the formate to release stored electrons and discharge the battery;
    wherein the electrocatalyst performs the conversion in an external acid selected such that the electrocatalyst has a pKa equal to the pKa of the external acid, and wherein the electrocatalyst has a hydricity equal to a hydricity of formate under identical solvent conditions.

6. The method of claim 5, wherein the positive active material is ferrocyanide, Prussian white, Prussian blue, or bromide.

7. The method of claim 6, wherein the positive active material is oxidized from ferrocyanide to ferricyanide, Prussian white to Prussian blue, Prussian blue to berlin green, or bromide to bromine.

8. The method of claim 5, wherein the electrocatalyst is $Pt(1,2\text{-bis(diethylphosphino)ethane})_2$ or $[Pt(1,2\text{-bis(diethylphosphino)ethane})_2][PF_6]_2$.

9. The method of claim 5, wherein the electrocatalyst reversibly interconverts carbon dioxide, bicarbonate, or carbonate and formate or formic acid with an overpotential of about <100 mV, <90 mV, <80 mV, <70 mV, <60 mV, <50 mV, <40 mV, <30 mV, <25 mV, <20 mV, or <10 mV.

10. The method of claim 5, wherein the electrocatalyst reversibly interconverts carbon dioxide, bicarbonate, or carbonate and formate or formic acid with a current efficiency of about of about >90%, >91%, >92%, >93%, >94%, >95%, >96%, >97%, >98%, or >99%.

11. An electrocatalyst for reversibly interconverting carbon dioxide, bicarbonate, or carbonate and formate or formic acid;
    wherein the electrocatalyst performs the reversible interconversion in an external acid selected such that the electrocatalyst has a pKa equal to the pKa of the external acid, and wherein the electrocatalyst has a hydricity equal to a hydricity of formate under identical solvent conditions.

12. The electrocatalyst of claim 11, wherein the electrocatalyst is selected from $Pt(1,2\text{-bis(diethylphosphino)ethane})_2$ or $[Pt(1,2\text{-bis(diethylphosphino)ethane})_2][PF_6]_2$.

* * * * *